United States Patent [19]

Blackburn

[11] 3,746,064
[45] July 17, 1973

[54] TREE HARVESTER
[75] Inventor: Keith Blackburn, Enumclaw, Wash.
[73] Assignee: Franklin Equipment Company, Franklin, Va.
[22] Filed: June 2, 1972
[21] Appl. No.: 258,972

Related U.S. Application Data
[63] Continuation of Ser. No. 88,331, Nov. 10, 1970, abandoned.

[52] U.S. Cl. .......................................... 144/309 AC
[51] Int. Cl. ............................................ A01g 23/08
[58] Field of Search ................. 144/2 Z, 3 D, 34 R, 144/34 E, 309 AC

[56] References Cited
UNITED STATES PATENTS
3,277,936  10/1966  Larson ................................ 144/3 D

*Primary Examiner*—Gerald A. Dost
*Attorney*—Edward M. Prince

[57] ABSTRACT

A mobile tree harvester including a self-propelled vehicle, tree-shearing means, a pair of vertically spaced, oppositely facing engaging means mounted on the vehicle for catching the severed tree at the commencement of its free fall and for controlling the free fall of the tree until the tree is nearly horizontal, and lifting means for lifting the tree-shearing means and the engaging means upwardly and rearwardly until the severed tree carried thereby is nearly horizontal, and a method for harvesting trees using this harvester.

41 Claims, 10 Drawing Figures

Patented July 17, 1973

INVENTOR
KEITH BLACKBURN
BY Cushman, Darby & Cushman
ATTORNEYS

Patented July 17, 1973

INVENTOR
KEITH BLACKBURN

BY Cushman Darby Cushman
ATTORNEYS

Patented July 17, 1973

INVENTOR
KEITH BLACKBURN

Cushman, Darby & Cushman
ATTORNEYS

TREE HARVESTER

This is a continuation, of application Ser. No. 88,331 filed Nov. 10, 1970 and now abandoned.

BACKGROUND OF THE INVENTION

This invention relates to a method and apparatus for harvesting trees, and more particularly to a self-propelled tree harvester and its method of operation.

Lumber and pulpwood industries require large quantities of trees on a daily basis to maintain continuous operation. This demand has resulted in various attempts to mechanize the apparatus and method of cutting down such trees. At one time, of course, these operations were done manually. At the present time, however, there are many devices and methods for harvesting trees as well as processing the trees in the field. When a tree is processed in the field, the branches are generally removed and the trunk of the tree is cut into lengths. The present invention, however, is not directed to tree processing.

An example of a tree harvester is shown in the patent to Bombardier, U.S. Pat. No. 3,074,447, of Jan. 22, 1963, which shows a self-propelled vehicle capable of cutting trees, loading the same on the vehicle, and transporting the trees to another location. In Bombardier, however, there is provided at least two pairs of jaws spaced from each other for encircling and clamping the trunk of a standing tree. The necessity of closing the jaws to grasp the tree trunk is just another step which increases the complexity of the tree harvesting operation and adds time to the complete process. The tree in Bombardier is continuously controlled during its fall. Nevertheless, there is no attempt in this patent to take full advantage of the free fall of the tree by merely engaging and abutting the tree at spaced positions.

Another tree-harvesting vehicle is shown in the patent to Blonsky, U.S. Pat. No. 3,528,468, of Sept. 15, 1970, in which there is provided a vehicle for cutting trees, loading the same on the vehicle itself, and transporting the trees to another location. Blonsky makes maximum use of the free fall of the tree by using a wedge-type cutter blade to sever the tree and start the rearward fall of the tree. Once severed, the shear blade is raised a short distance to "toss" the tree onto the vehicle. It is contended that the lifting operation reduces the impedance of the fall of the tree by the foliage of adjacent trees. Nevertheless, this apparatus is only workable in relatively open areas. It is quite apparent that one cannot catch trees in a free fall in a dense forest. There is no providsion in Blonsky which permits the tree harvester to control the fall so that it can be stopped at any moment and the vehicle moved ahead to clear the top of the tree.

SUMMARY OF THE INVENTION

The applicant's invention overcomes the defects discussed above by controlling the free fall of the tree with a simple control mechanism using a simple method of operation. Basically, there is provided a self-propelled vehicle having the usual tree-shearing means. By using the center of gravity of the tree and effecting free fall of the tree into a position where it is engaged by a pair of vertically spaced holding or engaging means, the tree trunk can be lifted upwardly and rearwardly into a generally horizontal position above the tree-receiving bunk. The tree is then dropped into the bunk and held in place by a grapple means while the vehicle is moved to the next tree.

Instead of using the complicated tree-grappling means, such as shown in Bombardier and many of the other patents, there is provided a pair of vertically spaced engaging means adapted to be positioned on opposite sides of the trunk during the severance of the trunk from the stump. The upper engaging means is horizontally concave, such as being V-shaped, and provides a forwardly-facing cradle for receiving the trunk of the tree at the commencement of its rearward, free fall and a rearwardly-facing, support means for catching and holding the trunk of the tree adjacent the severed butt after the tree has been completely severed.

DETAILED DESCRIPTION OF PREFERRED EMBODIMENTS

Figure 1:
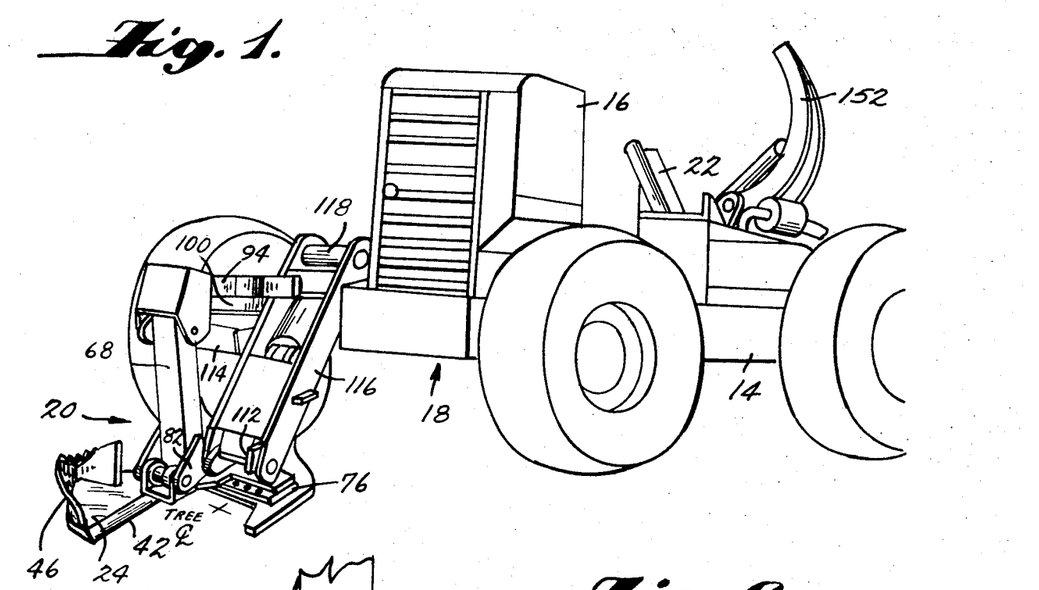
FIG. 1 is a front perspective view of the tree harvester.

There is shown in FIG. 1 a tree harvester 12 including a self-propelled vehicle 14 having a cab 16 mounted on one side 18 thereof and having a front assembly 20 mounted forwardly on the other side of the vehicle and a bunk or cradle 22 mounted rearwardly on the other side of the vehicle.

Figures 2, 8:
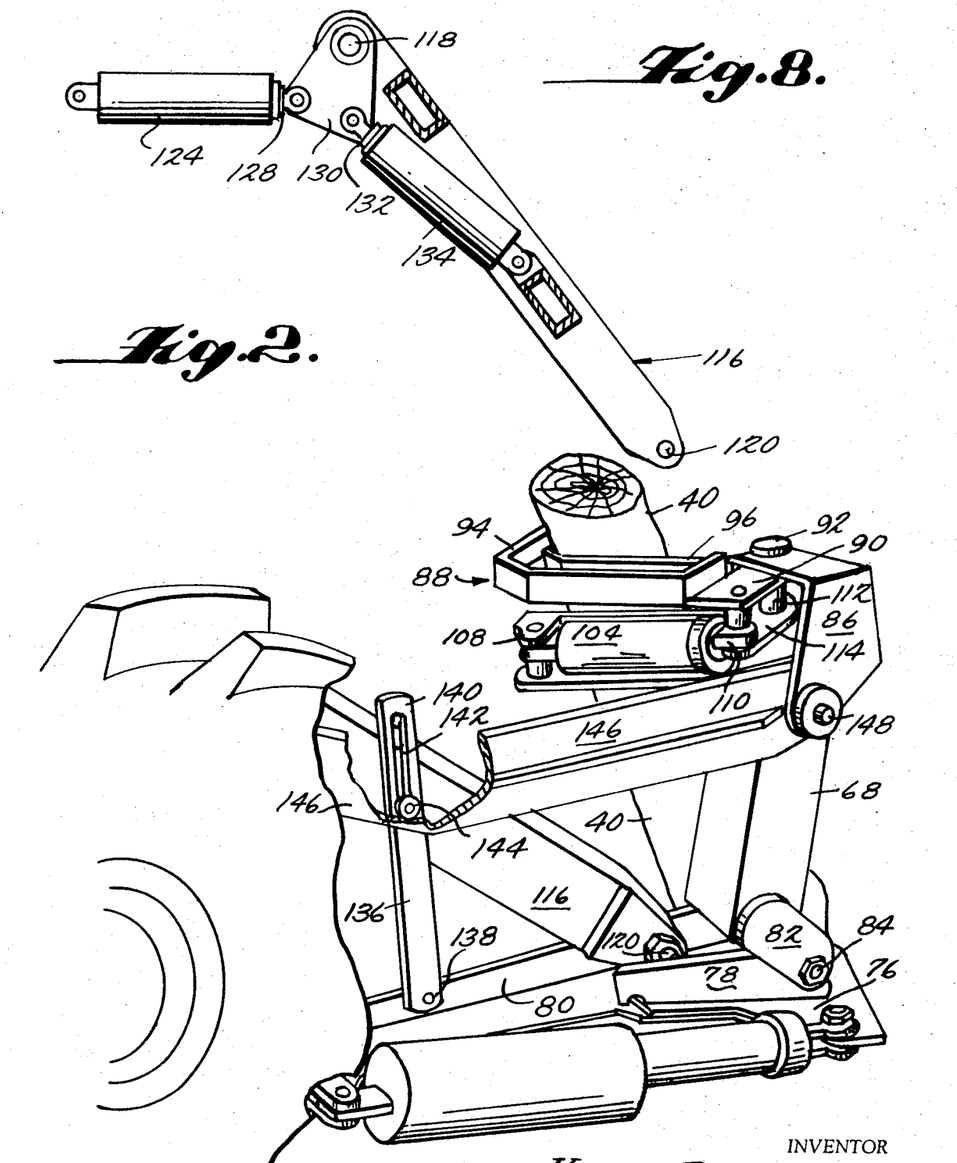
FIG. 2 is a side perspective view, partially broken away for clarity, of the front assembly of the tree harvester.
FIG. 8 is a fragmentary, side view of the tandem cylinder and piston means used to operate the lift arm.
Figures 3, 4, 5:
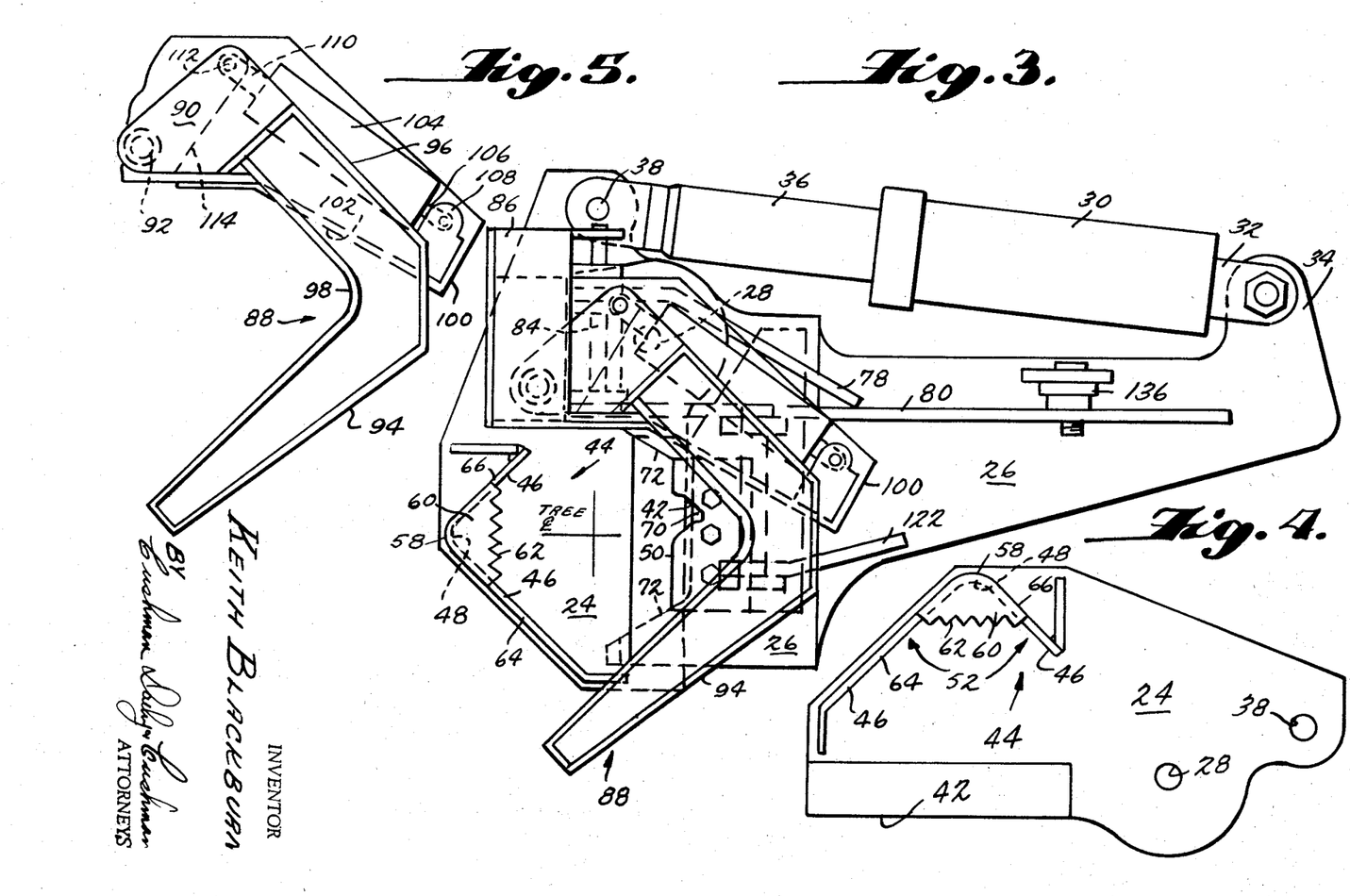
FIG. 3 is a top plan view of the front assembly with parts broken away for clarity.
FIG. 4 is a top plan view of the shear blade.
FIG. 5 is a top plan view of the vee arm and knock-off blade.
Figure 6:
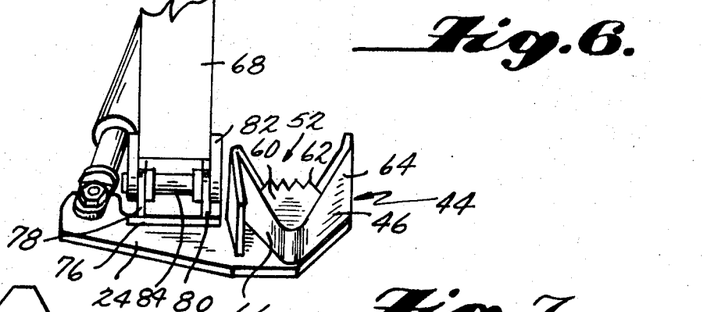
FIG. 6 is a front perspective view of the shear blade.

The front assembly 20 is shown in detail in FIGS. 2–7 and includes a shear blade 24 pivotally mounted on a shear plate 26 by pin 28 shown in dotted lines in FIG. 3. The shear blade 24 is operated by a cylinder and piston means having the cylinder 30 attached at its rear end 32 to the rear end 34 of the shear plate 26. The piston 36 extends forwardly and is attached to the shear blade 24 by means of pivot pin 38. A piston is operated from the cab 16 to move the shear blade between an open, tree-receiving position illustrated in FIG. 1 and a closed position illustrated in FIGS. 2, 3 and 7 in which the tree 40 has been completely severed.

Figure 7:
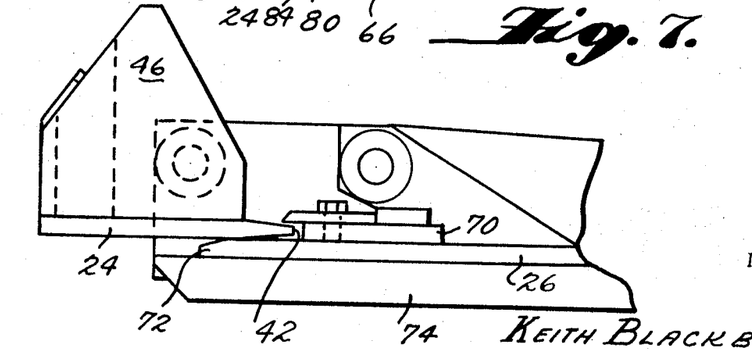
FIG. 7 is a side view of the shear blade in a closed position with the shear plate.

The side of the shear blade opposite to the connection of the piston has a typical wedge-type cutting edge 42 illustrated in FIG. 7. Spaced from the cutting edge and uprightly mounted, preferably vertically, on the shear blade is a lower engaging means 44 comprising a horizontally concave support plate 46 having the open ended elbow or crook 48 facing the same direction as the cutting edge 42 and, when the shear blade is closed, facing rearwardly toward the vehicle 14 and the opposing anvil 50. As illustrated, the support plate 46 is V-shaped and within the scope of this invention, the word "concave" includes a V-shaped support plate or a vee arm, described hereinafter. Thus, whenever the term V-shaped or vee arm is used, there could easily be equivalent, concave configurations.

An upwardly facing opening 52 is provided at the top of the V-shaped support plate. This opening is cut along a plane insecting the planes of the two walls 64 and 66 comprising the generally V-shaped support plate and at an obtuse angle to the juncture 58 of the two walls 64 and 66. A gripper plate 60 having tree-engaging teeth or a serrated edge 62 is mounted on the support plate a short distance above the shear blade and angularly inclined with respect to the support plate. As illustrated, this gripper plate is mounted on the top of the support plate and blocks part of the opening 52. It is important to have the gripper plate spaced above the shear blade so as to be able to engage the tree trunk 40 adjacent the butt of the tree when it begins its free fall, but the gripper plate could take a variety of angular relationships with respect to a plane perpendicular to the shear blade. The tree-engaging teeth point in the same general direction as the cutting edge of the shear blade and thus point rearwardly and toward the vehicle.

It will be noted that one side 64 of the support plate is longer than the other side 66. This construction is desirable in order to catch the tree trunk adjacent the butt when it is completely severed. The branches of the severed tree may try to rotate or turn the tree immediately after severance. On the other side of the vertical support means is an upright post 68 which will block the tree should it attempt to turn in that direction.

The anvil 50 is fixedly attached to a spacer plate 70 which is in turn attached to the shear plate, and the anvil lies in a plane approximately parallel to the plane of the shear blade and slightly above the cutting edge of the shear blade, as illustrated in FIG. 7. Within the context of the application, the spacer plate 70 is considered to be a part of the shear plate 26 and thus the anvil is described as being fixedly attached to the shear plate. The spacer plate is in alignment with the cutting edge of the shear blade and is recessed rearwardly from the forward edge of the anvil, thus permitting the cutting edge of the shear blade to extend under the forward edge of the anvil. The shear plate has a pair of laterally disposed guide arms 72 converging toward the anvil so as to cooperate with the anvil in holding the tree in place during severance. As seen in FIG. 7, there is a reinforcement member 74 extending under the shear plate, which not only reinforces the shear plate but keeps the shear plate and shear blade off the ground.

A post support plate 76 is mounted on the shear plate. The post 68 is in turn mounted uprightly on the post support plate 76 and thus is considered to be mounted on the shear plate. As illustrated in FIG. 2, the post leans slightly forwardly when the shear plate is horizontal and upright. A pair of upright stiffeners 78 and 80 are mounted on the support plate and extend onto the shear plate at their rear end portions. Two lugs 82 are attached to the post on opposite sides of the post and, as illustrated, are forwardly inclined with respect to the post. These lugs are pivotally mounted on a pin 84 extending through the two stiffener plates so that the post is pivotally mounted along a horizontal axis on the post support plate which is in turn mounted upon the shear plate. Within the context of this invention, the post support plate is considered to be a part of the shear plate and thus the post is pivotally attached to the shear plate. The post extends upwardly and, when the shear blade is in an upright, horizontal position, the post extends forwardly. A hood 86 is fixedly mounted on the top of the post and is considered to be part of the post construction.

An upper engaging means 88, shown separately in FIG. 5, is mounted at one end 90 on the post by pin 92. The upper engaging means comprises a concave, forwardly facing arm 94, illustrated as being of generally V-shaped configuration, having one arm porition 96 pivotally mounted at its end 90 by the pin 92. The open ended elbow or crook 98 of the concave, V-shaped arm is adapted to receive the trunk of the tree at the commencement of the free fall of the tree as illustrated in FIG. 2.

A knock-off plate or member 100, likewise shown separately in FIG. 5, is fixedly attached to the post adjacent to and below the vee arm 94. The knock-off member has a tree-abutting side 102 which is in approximate alignment with that portion 96 of the vee arm having its end pivotally connected to the post. The knock-off plate or member is, for the most part, slightly to one side of the vee arm so as to be out of the way when the vee arm receives the tree at the commencement of the free fall of the tree. The knock-off plate also supports the cylinder and piston means operating the vee arm. The cylinder 104 is shown as being attached at its rear end 106 to a yoke and pin arrangement 108 mounted on the knock-off plate. The free end of the piston 110 is attached to a perpendicular pin 112 mounted at its upper end on the vee arm and secured at its lower end to a radius arm 114 extending from pin 112 to pin 92. It will be noted that the attachment of the pin 112 to the vee arm is at a point disposed from the pivotal connection of the vee arm to the post so as to permit rotation of the vee arm about pin 92 by activation of the cylinder and piston means.

A lift arm 116 is attached at one end to the vehicle by pin 118, as shown in FIG. 1, and is pivotally attached by pin 120 at its other end to stiffener plates 80 and 122 which are in turn attached to the shear plate. Thus, within the context of the invention, the lift arm is described as being pivotally connected to the shear plate. A pair of tandem pistons and cylinders are used to operate the lift arm, as illustrated in FIG. 8. The rear cylinder 124 is attached to the vehicle at 126 (see FIG. 9) which is rearwardly of the pivotal connection 118 of the lift arm to the vehicle and has its associated piston 128 pivotally attached to a triangular pivot plate 130 commonly mounted at one apex on the pivot pin 118 attaching the lift arm to the vehicle. The piston 132 of the forward cylinder 134 is likewise attached to another apex of the triangular pivot plate 130. The cylinder 134 extends forwardly and is attached to the lift arm 116.

The tandem cylinders (and pistons) can operate simultaneously or either one of the cylinders could operate first with the other cylinder beginning to operate upon completion or prior to completion of the operation of the first cylinder. It will be seen that this arrangement is designed to lift the arm upwardly and rearwardly. The front cylinder can lift the arm partially upwardly, but without any additional help, it will be seen that the front cylinder will soon complete the stroke. However, the rear cylinder operates to rotate the triangular plate about pivot pin 118 so as to complete the upwardly and rearwardly motion of the lift arm 116.

In order to provide additional support for the shear plate, a link member 136 is attached at one end 138 to the shear plate by having the link member secured to the stiffener plate 80 attached to the shear plate. The other end 140 of the link member has a slot 142 with bolt means 144 extending through the slot to connect the link member to the lift arm 116. The slot permits the angle between the lift arm and the shear plate to change.

A guide arm 146 is pivotally attached to the vehicle rearwardly of the attachment of the lift arm to the vehicle and extends forwardly, when the shear plate is parallel to the ground and upright, and is pivotally attached to the upper porition of the post at 148. The guide arm 146 supports the post when it is moved upwardly and rearwardly by the lift arm.

Figures 9, 10:
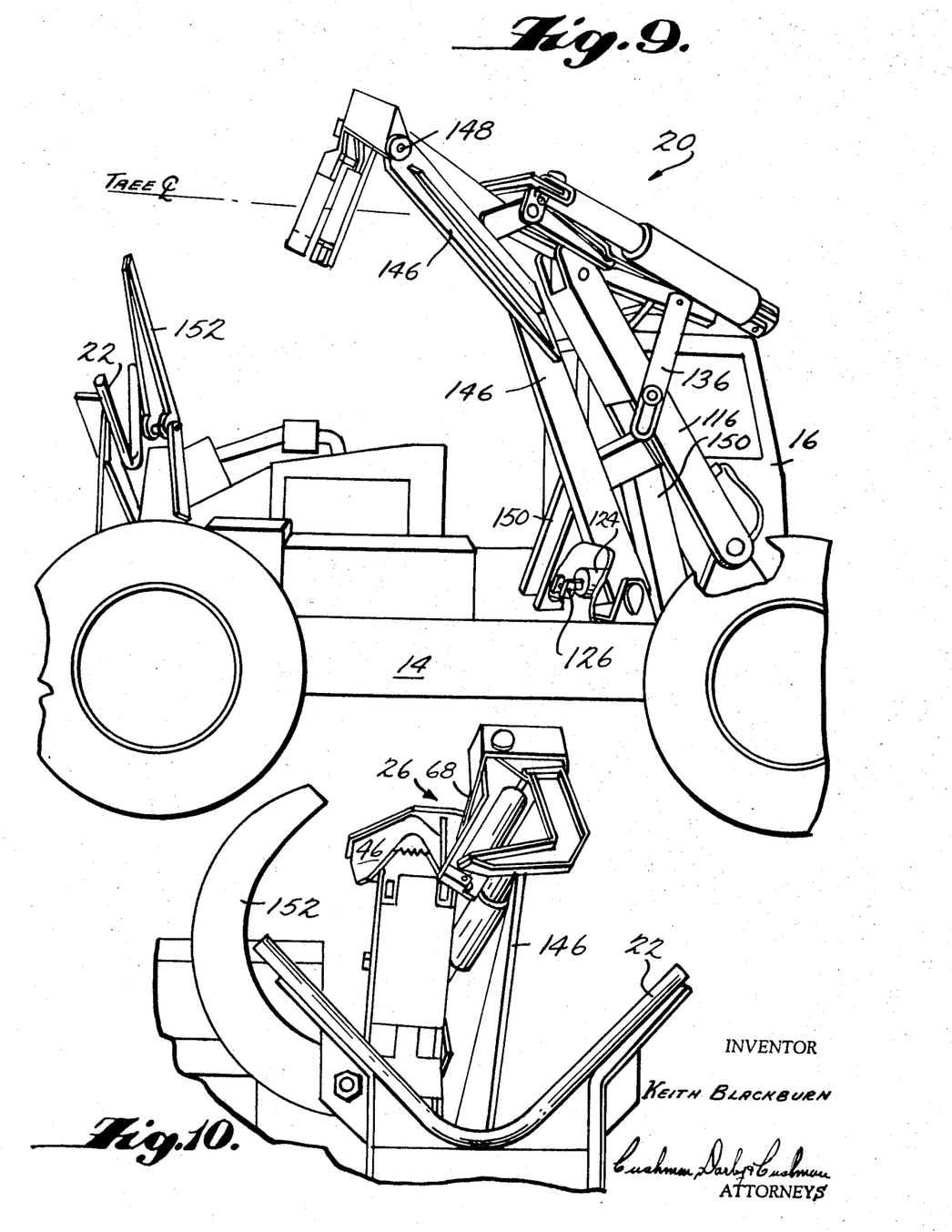
FIG. 9 is a side perspective view of the tree harvester with the lifting arm fully raised.
FIG. 10 is a rear perspective view of the tree harvester shown in FIG. 9.

As shown in FIG. 9, a stop means 150 is mounted on the vehicle rearwardly of the lift arm and in the pivotal path of the lift arm to stop the rearward movement of the lift arm once it has passed through a vertical alignment. The pivotal path of the lift arm lies in a perpendicular plane laterally adjacent to the cab so that the arm and any tree carried by it moves upwardly and rearwardly to one side of the cab. Moreover, the plane of movement of the lift arm is preferably perpendicular to the shear plate and shear blade.

The bunk or cradle 22 is aligned with the lift arm 116 to receive the severed tree. A grapple arm 152 is pivotally mounted on the vehicle adjacent the bunk for movement between an open position in which the severed tree can be dropped into the bunk and a closed position facing the bunk in which the grapple arm 152 abuts against the tree and holds the tree in the bunk 22.

METHOD OF OPERATION

The tree harvester approaches the tree 40 with the shear blade open and engages the tree with the anvil 50 using the shear plate guide arms 72 to center the shear plate on the tree. The hydraulic cylinder and piston are actuated to close the shear plate and bring the cutting edge 42 into engagement with the tree trunk. The anvil blade penetrates the trunk of the tree and holds the shear plate in engagement with the tree so that it will not have the tendency to rise during the severing process. The cutting edge cuts through the tree. As it cuts through the tree, the wedging configuration of the shear blade (see FIG. 7) initiates the free fall of the tree in a rearward direction toward the vehicle. As illustrated in FIG. 2, the rearward side of the tree is engaged by the vee arm 94 upwardly spaced from the severed butt of the tree trunk at the commencement of the free fall of the tree. As the tree is severed, it will be seen that the center of gravity of the tree lies rearwardly of the vee arm so that the tree tends to pivot over the vee arm as the forward side of the tree adjacent the butt of the severed tree engages the lower engaging means 44. Generally, this engaged portion of the forward side of the tree trunk engages the upright support plate 46, but as will be appreciated, the tree trunk may take a variety of configurations, and it may be found that the support plate as well as the tree-engaging teeth or either of them abut the forward side of the trunk of the tree.

With the upper engaging means abutting the rearward side of the tree upwardly spaced from the severed butt and the lower engaging means abutting the forward side of the tree adjacent the severed butt, the front assembly of the tree harvester has complete control over the tree. A portion of the butt of the severed trunk will also be supported by the shear blade. While it is not necessary, it may be described to provide a hook arm mounted on the post for engaging the tree and insuring that the free fall of the tree will land it in the vee arm. However, there is no need nor any space for a hook arm to cooperate with the lower engaging means.

The lift arm is actuated to lift the front assembly including the shear plate, shear blade and vee arm, upwardly and rearwardly. Thus, the butt of the tree is moved upwardly and rearwardly while the fall of the tree is simultaneously controlled. The lift arm is operated until it comes into engagement with the stop member. At any time during this operation, the actuation of the lift arm can be stopped, and the tree held in a suspended position. It will also be appreciated that this feature enables the vehicle to be moved forwardly to clear the branches of the severed tree from surrounding standing trees during the fall of the severed tree. Thus, this tree harvester is particularly adaptable for the use in dense forests. During the upward and rearward movement of the tree trunk, the shear plate passes through a vertical plane. As illustrated schematically in FIG. 9, the center line of the tree is approximately horizontal at the end of the movement of the lift arm. Of course, longer trees will bend downwardly near the branches because of the weight of the top portion of the trees and the distance of the top portion from the supporting members. As the tree trunk is moved upwardly and rearwardly, the forward side of the tree will become principally engaged by the gripper plate having the tree-engaging teeth. Thus, the diverging opening 52 formed at the top of the support plate will permit the tree to rotate into a position where it is engaged by the teeth. At this position, the butt of the tree may be free of any contact with the shear blade, and the tree may only be held by the tree-engaging teeth.

When the lift arm has pivoted fully so that the tree lies above the bunk, the cylinder 104 and piston 110 mounted on the knock-off plate are actuated to pivot the vee arm from beneath the tree. The tree has a tendency to remain engaged in the crook 98 of the vee arm as the vee arm begins to rotate. Thus, the tree is moved over slightly until it abuts the knock-off plate which knocks the tree from the vee arm through the abutment of the tree against the fixed knock-off plate. The tree then falls into the bunk, and the grapple arm can be actuated to engage and hold the tree in the bunk. At this point, the vehicle can be moved to the next location, draggging the severed tree behind it, and can again begin the operation. It will thus be seen that this device performs an effective, quick and controlled harvesting operation.

While the preferred forms of the invention have been illustrated in the drawings and discussed above, it should be adequately clear that considerable modification may be made thereto without departing from the principles of the invention. Therefore, the foregoing should be considered in an illustrative sense rather than a limiting sense, and accordingly the extent of this invention should be limited only by the spirit and scope of the cliams appended hereto.

What is claimed is:

1. A mobile tree harvester comprising:
a self-propelled vehicle;
tree-shearing means operatively mounted on the vehicle, the tree-shearing means including a shear plate operatively connected to the vehicle, a shear blade having a cutting edge pivotally mounted on the shear plate, and anvil means fixedly mounted on the shear plate;
actuating means mounted on the vehicle and operatively connected to the shear blade for actuating the shear blade to sever the trunk of a tree and to initiate free fall of the tree towards the engaging means;
a pair of vertically spaced engaging means for engaging the severed tree at the commencement of the free fall of the tree and for controlling the free fall of the tree, each of the pair of engaging means facing each other when engaged with a tree and adapted to engage opposite sides of the tree, the lower one of the pair of vertically spaced engaging means being open sided, and the pair of vertically spaced engaging means being carried by the tree-shearing means;
lifting means pivotally attached at one end to the vehicle and operatively connected at the other end to the tree-shearing means and to the engaging means for simultaneously lifting the tree-shearing means and the engaging means upwardly and rearwardly in a plane perpendicular to the plane of the shear blade.

2. The mobile tree harvester defined in claim 1 wherein each of the pair of vertically spaced engaging means is horizontally concave.

3. The mobile tree harvester defined in claim 1 wherein the lower one of the pair of vertically spaced engaging means has tree-engaging teeth spaced a short distance above the shear blade so as to engage the tree trunk adjacent its butt end.

4. The mobile tree harvester defined in claim 3 wherein the tree-engaging teeth point in the same general direction as the cutting edge of the shear blade.

5. The mobile tree harvester defined in claim 1 wherein the lower one of the pair of vertically spaced engaging means comprises a support plate mounted uprightly on the movable shear blade and a gripper plate having tree-engaging teeth mounted on the support plate a short distance above the shear blade and angularly inclined with respect to the support plate.

6. The mobile tree harvester defined in claim 5 wherein the support plate is horizontally concave.

7. The mobile tree harvester defined in claim 6 wherein the support plate is generally V-shaped, the V-shaped support plate having its open ended crook facing the anvil means when the shear blade is fully closed, and means defining an upwardly facing opening cut along a plane intersecting the planes of the two walls comprising the generally V-shaped support plate at an obtuse angle to the juncture of the two walls comprising the generally V-shaped support plate.

8. The mobile tree harvester defined in claim 2 wherein the upper one of the pair of vertically spaced engaging means comprises pivotally mounted, concave, forwardly-facing arm means.

9. The mobile tree harvester defined in claim 8 wherein the arm means comprises a vee arm having one end pivotally mounted on the harvester and operatively supported above and by the shear plate.

10. The mobile tree harvester defined in claim 9 additionally comprising knock-off means connected to the harvester and operatively mounted above and by the shear plate for knocking the tree trunk from the vee arm when the vee arm is pivoted from beneath the tree.

11. The mobile tree harvester defined in claim 9 additionally comprising a knock-off plate fixedly attached to the harvester and operatively mounted above and by the shear plate in generally parallel relation to the vee arm and adjacent and in approximate alignment with that portion of the vee arm having an end pivotally connected to the harvester and mounted above the shear plate.

12. The mobile tree harvester defined in claim 11 additionally comprising a hydraulic cylinder and piston means, the cylinder means being attached at its rear end to the knock-off plate and the free end of the piston being attached to a pin means perpendicularly mounted on the vee arm at a point disposed from the pivotal connection of the vee arm to the harvester.

13. The mobile tree harvester defined in claim 1 wherein the lifting means is pivotally connected at one end to the vehicle and is pivotally connected at one other end of the lifting means to the shear plate and additionally comprising a link member attached at one end to the shear plate at a position rearwardly spaced from the connection of the lifting means to the shear plate, the link member having a slot at the other end of the link member, bolt means extending through the slot and connected to the lifting means, the slot permitting the angle between the lifting means and the shear plate to change.

14. The mobile tree harvester defined in claim 1 wherein the anvil means is mounted on the shear plate in a plane approximately parallel to the shear blade and slightly above the cutting edge of the shear blade.

15. The mobile tree harvester defined in claim 13 additionally comprising an upright post pivotally connected at the lower end of the post to the shear plate and wherein the upper one of the pair of vertically spaced engaging means comprises horizontally concave, forwardly-facing arm means pivotally connected at one end of the arm means to the upper end of the post.

16. The mobile tree harvester defined in claim 15 additionally comprising a knock-off plate mounted on the post adjacent the portion of the arm means attached to the post.

17. The mobile tree harvester defined in claim 1 additionally comprising bunk means mounted on the vehicle for receiving the trunk of the severed tree.

18. The mobile tree harvester defined in claim 17 additional comprising grapple means pivotally mounted on the vehicle for movement into a position facing the bunk means so as to hold a tree in the bunk means.

19. The mobile tree harvester defined in claim 1 wherein the lifting means comprises a lift arm pivotally attached at one end to the vehicle and pivotally attached at the other end to the shear plate and a pivot pin for attaching said one end of the lift arm to the vehicle.

20. The mobile tree harvester defined in claim 19 additionally comprising hydraulic means for operating the lifting arm, the hydraulic means including a pair of hydraulic cylinders and pistons and a pivot plate falling between the two cylinders and pistons and commonly mounted on the pivot pin attaching the lifting arm to the vehicle, one cylinder and piston means being pivotally attached at one end to the vehicle rearwardly of the pivotal attachment of the lifting arm to the vehicle and being pivotally attached at the other end to the pivot plate and the other clyinder and piston means being pivotally attached at one end to the pivot plate and being pivotally attached at the other end to the lifting arm.

21. The mobile tree harvester defined in claim 20 wherein the pistons of each cylinder are pivotally secured at the free ends of the pistons to the pivot plate.

22. The mobile tree harvester defined in claim 1 additionally comprising stop means mounted on the vehicle in the pivotal path of the lifting means to stop the rearward movement of the lifting means.

23. The mobile tree harvester defined in claim 1 additionally comprising a cab mounted on one side of the vehicle and laterally adjacent a portion of the lifting means, the perpendicular pivoting plane of the lifting means lying laterally adjacent the cab so that the severed tree is moved upwardly and rearwardly in a plane lying laterally to one side of the cab.

24. The mobile tree harvester defined in claim 1 additionally comprising an upright post pivotally connected at the lower end of the post to the shear plate, and having the upper one of the vertically spaced engaging means pivotally attached to the upper portion of the post and guide means having opposite ends, one end of the guide means being pivotally attached to the vehicle and the other end being pivotally attached to the upper portion of the post to support the post when it is moved upwardly and rearwardly by the lifting means.

25. The mobile tree harvester defined in claim 24 wherein the guide means comprises a guide arm.

26. The mobile tree harvester defined in claim 25 wherein the guide arm is mounted on the vehicle rearwardly of the pivotal connection of the lifting arm to the vehicle.

27. A mobile tree harvester comprising:
a self-propelled vehicle;
a shear plate connected to the forward end of the vehicle by a lift arm;
a lift arm pivotally secured at one end of the lift arm to vehicle end pivotally secured at the other end to the shear plate for lifting the shear plate upwardly and rearwardly in a plane perpendicular to the shear plate;
an anvil fixedly mounted on the shear plate;
a shear blade pivotally attached to the shear plate and having a cutting edge;
means for pivotally operating the shear blade between an open position and a closed position in association with the anvil, the operating means being connected at one end to the shear plate and at the other end to the shear blade;
upwardly extending support means pivotally mounted on the shear plate; and
a pair of vertically spaced engaging means for engaging the severed tree and for controlling the free fall of the tree, each of the pair of engaging means facing each other when engaged with a tree and adapted to engage opposite sides of the tree, the lower one of the pair of vertically spaced engaging means being open sided and being mounted upon the shear blade, and the upper one of the pair of vertically spaced engaging means being pivotally mounted on the upwardly extending support means.

28. The mobile tree harvester defined in claim 27 additionally comprising bunk means mounted on the vehicle in alignment with the perpendicular plane of movement of the lift arm for receiving the severed trunk.

29. The mobile tree harvester defined in claim 28 additionally comprising grapple means mounted on the vehicle for movement into a position facing the bunk means so as to hold a tree in the bunk means.

30. The mobile tree harvester defined in claim 27 additionally comprising a guide arm pivotally attached at one end of the guide arm to the vehicle and pivotally attached at the other end of the guide arm to the upright support means.

31. The mobile tree harvester defined in claim 27 wherein the upper one of the pair of vertically spaced engaging means comprises a generally concave, forwardly-facing arm.

32. The mobile tree harvester defined in claim 31 wherein the arm is V-shaped.

33. The mobile tree harvester defined in claim 27 additionally comprising knock-off means mounted on the upright support means below the upper one of the pair of vertically spaced engaging means for abutting the tree trunk as the upper engaging means is pivoted from underneath the tree trunk.

34. The mobile tree harvester defined in claim 27 wherein the lower one of the pair of vertically spaced engaging means comprises a generally horizontally concave support plate mounted uprightly on the shear plate and in alignment with the cutting edge, the concave support plate opening in the same direction as the direction in which the cutting edge faces, and a gripper plate mounted on the support plate a short distance above the shear blade and angularly inclined with respect to a plane perpendicular to the shear plate.

35. The mobile tree harvester defined in claim 27 wherein the anvil is mounted in a plane approximately parallel to the shear blade and slightly above the cutting edge.

36. The mobile tree harvester defined in claim 27 additionally comprising bunk means mounted on the vehicle for receiving the severed tree, gripper means pivotally mounted on the vehicle for holding the severed trees in the bunk, a guide arm pivotally attached at one end to the vehicle and at a second end to the upwardly extending support means, and wherein the lower engaging means comprises a generally horizontally concave support plate mounted uprightly on the shear plate and the upper engaging means comprises a generally horizontally concave, forwardly facing arm.

37. The mobile tree harvester defined in claim 36 additionally comprising means mounted on the vertically mounted support means for knocking the tree from upper engaging means when the upper engaging means is pivoted from beneath the tree trunk.

38. The method of harvesting trees with a vehicle having tree-shearing means comprising the steps of:
severing the trunk of the tree by a tree-shearing means by cutting the trunk of the tree from one side of the tree to the other side of the tree, the one side being the forward side of the tree and facing away from the vehicle and the other side being the rearward side of the tree and facing the vehicle;

initiating free fall of the tree in a rearward direction toward the vehicle;

engaging at least the rearward side of the tree upwardly spaced from the butt of the severed trunk at the commencement of the free fall of the tree;

engaging only the forward side of the tree adjacent the butt of the severed trunk immediately after the tree trunk has been severed while simultaneously supporting the butt of the tree by the tree shearing means;

moving the butt of the tree upwardly and rearwardly while simultaneously controlling the fall of the tree until the tree is nearly horizontal; and depositing the trunk of the tree in a bunk carried by the vehicle.

39. The method of harvesting trees as defined in claim 38 additionally comprising the step of holding the trunk of the tree in the bunk while moving the severed tree forwardly.

40. The method of harvesting trees as defined in claim 39 additionally including the step of advancing the vehicle forwardly to another tree and repeating the harvesting operation.

41. The method of harvesting trees as defined in claim 40 additionally comprising the step of disengaging support from the butt of the tree trunk as the tree is moved into a nearly horizontal position.

* * * * *